United States Patent
Zakharov et al.

(10) Patent No.: US 11,809,524 B2
(45) Date of Patent: Nov. 7, 2023

(54) SYSTEM AND METHOD FOR TRAINING AN ADAPTER NETWORK TO IMPROVE TRANSFERABILITY TO REAL-WORLD DATASETS

(71) Applicants: Toyota Research Institute, Inc., Los Altos, CA (US); Woven Planet North America, Inc., Los Altos, CA (US)

(72) Inventors: Sergey Zakharov, San Francisco, CA (US); Wadim Kehl, Tokyo (JP); Vitor Guizilini, Santa Clara, CA (US); Adrien David Gaidon, Mountain View, CA (US)

(73) Assignees: Woven Planet North America, Inc., Los Altos, CA (US); Toyota Research Institute, Inc., Los Altos, CA (US)

( * ) Notice: Subject to any disclaimer, the term of this patent is extended or adjusted under 35 U.S.C. 154(b) by 280 days.

(21) Appl. No.: 17/384,008

(22) Filed: Jul. 23, 2021

(65) Prior Publication Data

US 2022/0300770 A1    Sep. 22, 2022

Related U.S. Application Data

(60) Provisional application No. 63/161,794, filed on Mar. 16, 2021.

(51) Int. Cl.
*G06F 18/21* (2023.01)
*G06T 19/20* (2011.01)
(Continued)

(52) U.S. Cl.
CPC ........ *G06F 18/2185* (2023.01); *G06F 18/213* (2023.01); *G06F 18/2148* (2023.01);
(Continued)

(58) Field of Classification Search
CPC .............. G06F 18/2185; G06F 18/213; G06F 18/2148; G06T 19/20; G06T 2207/10024;
(Continued)

(56) References Cited

U.S. PATENT DOCUMENTS

2020/0356790 A1* 11/2020 Jaipuria .................. G06F 18/28
2021/0103776 A1*  4/2021 Jiang .................... G06V 20/647
2022/0058817 A1*  2/2022 Vaquero Gomez ..... G06T 7/593

OTHER PUBLICATIONS

Lee et al, "Leveraging Pre-Trained 3D Object Detection Models For Fast Ground Truth Generation" IEEE, 21st International Conference on Intelligent Transportation Systems, Nov. 4-7, 2018, pp. 2504-2510 (Year: 2018).*

(Continued)

*Primary Examiner* — Kathleen Y Dulaney
(74) *Attorney, Agent, or Firm* — Christopher G. Darrow; Darrow Mustafa PC

(57) ABSTRACT

Systems and methods for training an adapter network that adapts a model pre-trained on synthetic images to real-world data are disclosed herein. A system may include a processor and a memory in communication with the processor and having machine-readable that cause the processor to output, using a neural network, a predicted scene that includes a three-dimensional bounding box having pose information of an object, generate a rendered map of the object that includes a rendered shape of the object and a rendered surface normal of the object, and train the adapter network, which adapts the predicted scene to adjust for a deformation of the input image by comparing the rendered map to the output map acting as a ground truth.

20 Claims, 5 Drawing Sheets

(51) Int. Cl.
G06V 10/24 (2022.01)
G06V 20/64 (2022.01)
G06F 18/213 (2023.01)
G06F 18/214 (2023.01)

(52) U.S. Cl.
CPC ............ *G06T 19/20* (2013.01); *G06V 10/242* (2022.01); *G06V 20/64* (2022.01); *G06T 2207/10024* (2013.01); *G06T 2207/20084* (2013.01); *G06T 2210/12* (2013.01); *G06T 2219/2021* (2013.01)

(58) Field of Classification Search
CPC ....... G06T 2207/20084; G06T 2210/12; G06T 2219/2021; G06T 2207/20081; G06T 2207/30261; G06T 7/73; G06T 2210/61; G06T 17/00; G06V 10/242; G06V 20/64; G06V 10/82; G06V 10/243; G06V 10/774; G06V 20/647
USPC ................................ 382/154, 103, 159, 276
See application file for complete search history.

(56) References Cited

OTHER PUBLICATIONS

Su et al., "SynPo-Net—Accurate and Fast CNN-Based 6DoF Object Pose Estimation Using Synthetic Training," Sensors 2021, 21, 300, pp. 1-16 (2021).

Wang et al., "Self6D: Self-Supervised Monocular 6D Object Pose Estimation," 27 pages, arXiv:2004.06468v3 [cs.CV] Aug. 3, 2020.
Mousavian et al., "3D Bounding Box Estimation Using Deep Learning and Geometry," 10 pages, arXiv:1612.00496v2 [cs.CV] Apr. 10, 2017.
Kehl et al., "SSD-6D: Making RGB-Based 3D Detection and 6D Pose Estimation Great Again," 9 pages, arXiv:1711.10006v1 [cs.CV] Nov. 27, 2017.
Loper et al., "OpenDR: An Approximate Differentiable Renderer," ECCV 2014, Part VII, LNCS 8695, pp. 154-169 (2014).
Kato et al., "Neural 3D Mesh Renderer," 17 pages, arXiv:1711.07566v1 [cs.CV] Nov. 20, 2017.
He et al., "Deep residual learning for image recognition," 12 pages, arXiv:1512.03385v1 [cs.CV] Dec. 10, 2015.
Chen et al., "Learning semantic segmentation from synthetic data: A geometrically guided input-output adaptation approach," Proceedings of the IEEE/CVF Conference on Computer Vision and Pattern Recognition (CVPR), 2019, pp. 1841-1850.
Hoffman et al., "CyCADA: Cycle-Consistent Adversarial Domain Adaptation," Proceedings of the 35th International Conference on Machine Learning, PMLR 80:1989-1998, 2018.
Lee et al., "SPIGAN: privileged adversarial learning from simulation," 14 pages, arXiv:1810.03756v3 [cs.CV] Feb. 18, 2019.
Luo et al., "Taking A Closer Look at Domain Shift: Category-level Adversaries for Semantics consistent Domain Adaptation," 10 pages, arXiv:1809.09478v3 [cs.CV] Apr. 1, 2019.
Patel et al., "Visual Domain Adaptation: A survey of recent advances," IEEE Signal Processing Magazine, vol. 32, Issue: 3, pp. 1-36 (2015).
Richter et al., "Playing for Data: Ground Truth From Computer Games," 16 pages, arXiv:1608.02192v1 [cs.CV] Aug. 7, 2016.

* cited by examiner

SYSTEM AND METHOD FOR TRAINING AN ADAPTER NETWORK TO IMPROVE TRANSFERABILITY TO REAL-WORLD DATASETS

TECHNICAL FIELD

The subject matter described herein relates, in general, to systems and methods for monocular three-dimensional ("3-D") object detection that leverages synthetic data and aims to improve transferability to real-world datasets using an adapter network.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Six degrees of freedom ("6D") pose information of an object includes the location of an object in a 3-D space (x, y, and z) and the orientation of the object in each axis. Some monocular 3-D object detection models receive a two-dimensional ("2-D") image as an input and output 3-D bounding boxes that include the 6D pose information of objects detected within the 2-D image. These monocular 3-D object detection models may use deep neural networks trained on a large collection of annotated data. However, it has been observed that these deep neural networks, despite being precise on a source data set with a limited predefined number of objects, begin to struggle when the data set is changed, even if other factors, such as camera settings and objects, remain the same.

One explanation for this issue is the scarcity of training data for training deep neural networks. Moreover, there are only a handful of datasets for 6D object detection, mainly due to the expense of the 6D annotation process. Acquiring 3-D bounding boxes can be partially automated but still requires manual human labor.

One solution to the scarcity of training data involves using simulation data, sometimes referred to as synthetic data. Simulation data has perfect ground-truth information that can be used to supervise neural network training and generate highly accurate models for a series of tasks for which real-world labels are very challenging and/or expensive to generate. However, neural networks trained using synthetic data generally struggle when considering real-world data. This type of phenomenon is known as the "domain gap," wherein neural networks trained with synthetic data perform satisfactorily when considering synthetic data but perform poorly when considering real-world data.

SUMMARY

This section generally summarizes the disclosure and does not comprehensively explain its full scope or all its features.

In one embodiment, a system includes a processor and a memory in communication with the processor and having machine-readable instructions for training an adapter network that adapts a predicted scene to adjust for a deformation of the input image. When executed by the processor, the machine-readable instructions cause the processor to output, using a neural network that utilizes an input image that includes an object, a predicted scene that includes a three-dimensional bounding box having pose information of the object. In an intermediate operation, the neural network generates an output map indicating a shape of the object and/or a surface normal of the object.

When executed by the processor, the machine-readable instructions also cause the processor to generate, using a differentiable renderer and the predicted scene as an input, a rendered map of the object. The rendered map includes a rendered shape of the object and/or a rendered surface normal of the object. An adapter network is then trained by comparing the rendered map to the output map, wherein the output map is a ground truth.

In another embodiment, a method includes the steps of outputting, using a neural network, a predicted scene that includes a three-dimensional bounding box having pose information of an object and an output map, generating a rendered map of the object that includes a rendered shape of the object and/or a rendered surface normal of the object, and training an adapter network, which adapts the predicted scene to adjust for a deformation of the input image, by comparing the rendered map to the output map acting as a ground truth.

In yet another embodiment, a non-transitory computer-readable medium includes instructions that, when executed by a processor, causes the processor to output, using a neural network, a predicted scene that includes a three-dimensional bounding box having pose information of an object and an output map, generate a rendered map of the object that includes a rendered shape of the object and/or a rendered surface normal of the object, and train an adapter network, which adapts the predicted scene to adjust for a deformation of the input image, by comparing the rendered map to the output map acting as a ground truth Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method that can train an adapter network for a monocular 3-D object detection model. Moreover, because of the dearth of real-world training sets for training monocular 3-D object detection models, synthetic data sets may be utilized to train monocular 3-D object detection models. However, when considering real-world data, monocular 3-D object detection models trained using synthetic data sets perform poorly. The adapter network can adapt a model pre-trained on synthetic images to real-world data that was not observed at training time, allowing the model to be re-utilized for multiple real-world data sets.

Figure 1A:
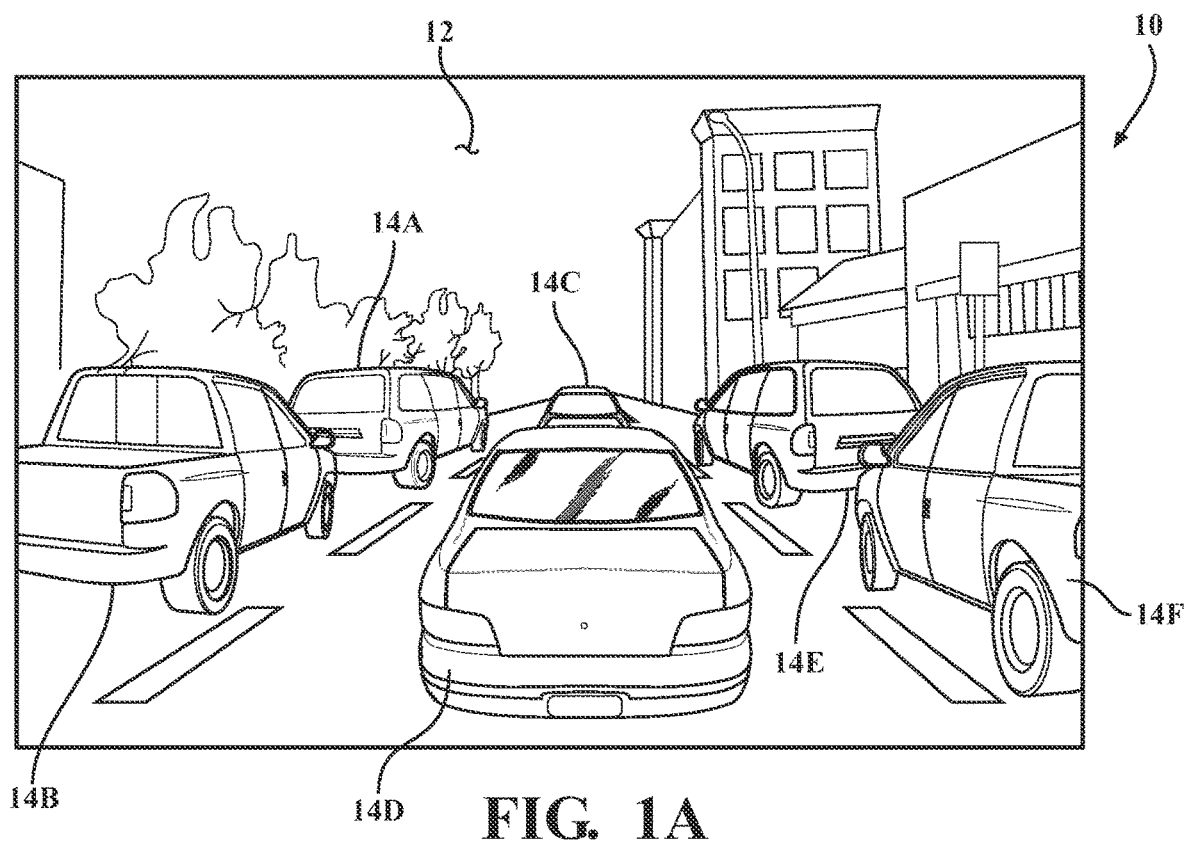
FIGS. 1A and 1B illustrate a synthetic input image provided to a monocular 3-D object detector model and an output that has recovered partial shapes and poses of objects within the input image, respectively.

To better understand the monocular 3-D object detection model(s) described in the specification, a brief description of the inputs utilized and outputs generated will be provided. FIG. 1A illustrates an input image 10. In this example, the input image 10 is a synthetic input image that a monocular 3-D object detection model will process. Here, the input image 10 is an image of a scene 12 having several objects. In particular, these objects include vehicles 14A-14E. The monocular 3-D object detection model described in the specification can recover partial shapes and poses of the vehicles 14A-14E.

Figure 1B:
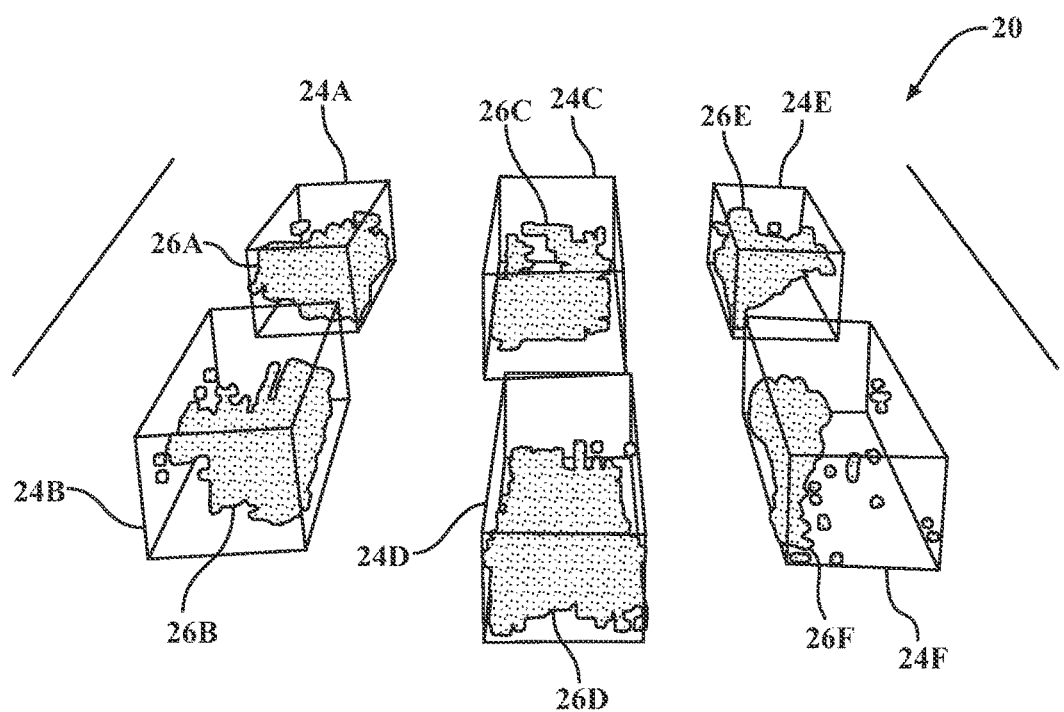

Moreover, referring to FIG. 1B, illustrated is an output 20 of the 3-D object detection model that has utilized the input image 10 as an input. Here, the output 20 includes bounding boxes 24A-24F for each of the vehicles 14A-14E. The bounding boxes 24A-24F for each of the vehicles 14A-14E are 3-D bounding boxes that include 6D pose information. The 6D pose information for each of the vehicles 14A-14E may include the location of the object in a 3-D space (x, y, and z) and the orientation of the object in each axis. In addition to the 6D pose information, the monocular 3-D object detection model described in the specification may also recover partial shapes 26A-26F for each of the vehicles 14A-14E.

Figure 2:
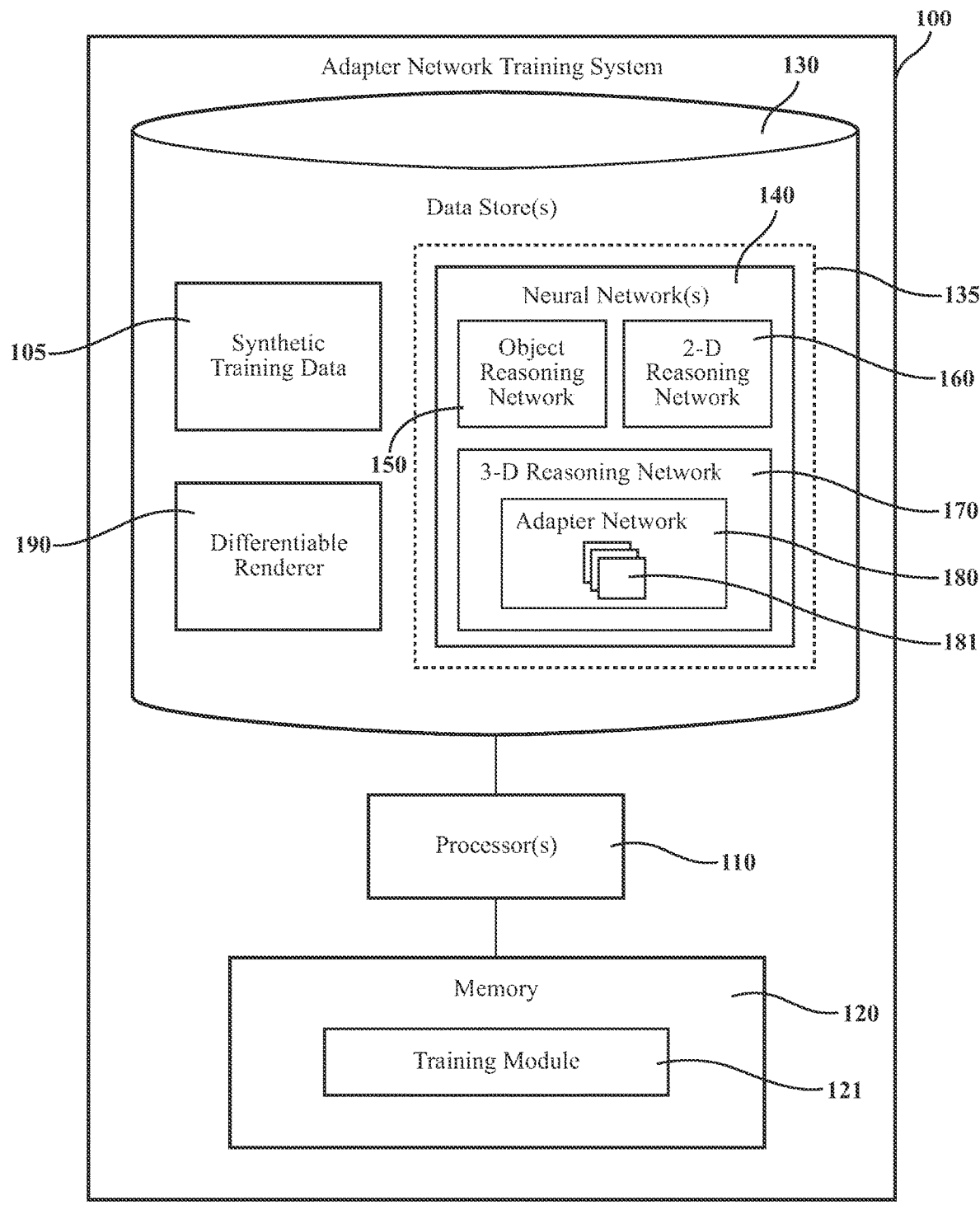
FIG. 2 illustrates an adapter network training system for training an adapter network that can adapt a model pre-trained on synthetic images to real-world data that was not observed at training time, allowing the monocular 3-D object detector model to be re-utilized for multiple real-world data sets.

With reference to FIG. 2, illustrated is one embodiment of an adapter network training system 100 for training an adapter network that can adapt a model pre-trained on synthetic images to real-world data that was not observed at training time, allowing the model to be re-utilized for multiple real-world data sets. As shown, the adapter network training system 100 includes one or more processor(s) 110. Accordingly, the processor(s) 110 may be a part of the adapter network training system 100, or the adapter network training system 100 may access the processor(s) 110 through a data bus or another communication path. In one or more embodiments, the processor(s) 110 is an application-specific integrated circuit that is configured to implement functions associated with a training module 121. In general, the processor(s) 110 is an electronic processor such as a microprocessor that is capable of performing various functions as described herein.

In one embodiment, the adapter network training system 100 includes a memory 120 that stores the training module 121. The memory 120 is a random-access memory (RAM), read-only memory (ROM), a hard disk drive, a flash memory, or other suitable memory for storing the training module 121. The training module 121 is, for example, computer-readable instructions that, when executed by the processor(s) 110, cause the processor(s) 110 to perform the various functions disclosed herein.

The training module 121 can be implemented as computer-readable program code that, when executed by a processor(s) 110, implement one or more of the various processes described herein. The training module 121 can be a component of the processor(s) 110, or the training module 121 can be executed on and/or distributed among other processing systems to which the processor(s) 110 is operatively connected. The training module 121 can include instructions (e.g., program logic) executable by one or more processor(s) 110.

Furthermore, in one embodiment, the adapter network training system 100 includes one or more data store(s) 130. The data store(s) 130 is, in one embodiment, an electronic data structure such as a database that is stored in the memory 120 or another memory and that is configured with routines that can be executed by the processor(s) 110 for analyzing stored data, providing stored data, organizing stored data, and so on. Thus, in one embodiment, the data store(s) 130 stores data used by the training module 121 in executing various functions. In one embodiment, the data store(s) 130 includes a monocular 3-D object detection model 135 that can receive, as an input, images of one or more objects and output bounding boxes and 6D pose information of the objects in the images.

The monocular 3-D object detection model 135 may include one or more neural network(s) 140. The neural network(s) 140 may include an object reasoning network 150, a 2-D reasoning network 160, and a 3-D reasoning network 170. In addition, the neural network(s) 140 may include an adapter network 180. As explained previously and will be explained in greater detail later in the specification, the adapter network 180 can adapt the monocular 3-D object detection model 135 that was pre-trained on synthetic images to real-world data that was not observed at training time, allowing the monocular 3-D object detection model 135 to be re-utilized for multiple real-world data sets. The adapter network training system 100 trains the adapter network 180 in a self-supervised manner. During the training, one or more model weights 181 of the adapter network 180 will be adjusted to improve the performance of the adapter network 180.

The data store(s) 130 may also store the synthetic training data 105 that may train one or more of the neural network(s) 140. The data store(s) 130 may also store a differentiable renderer 190, which, as will be explained in greater detail later, will be utilized to train the adapter network 180.

Figure 3:
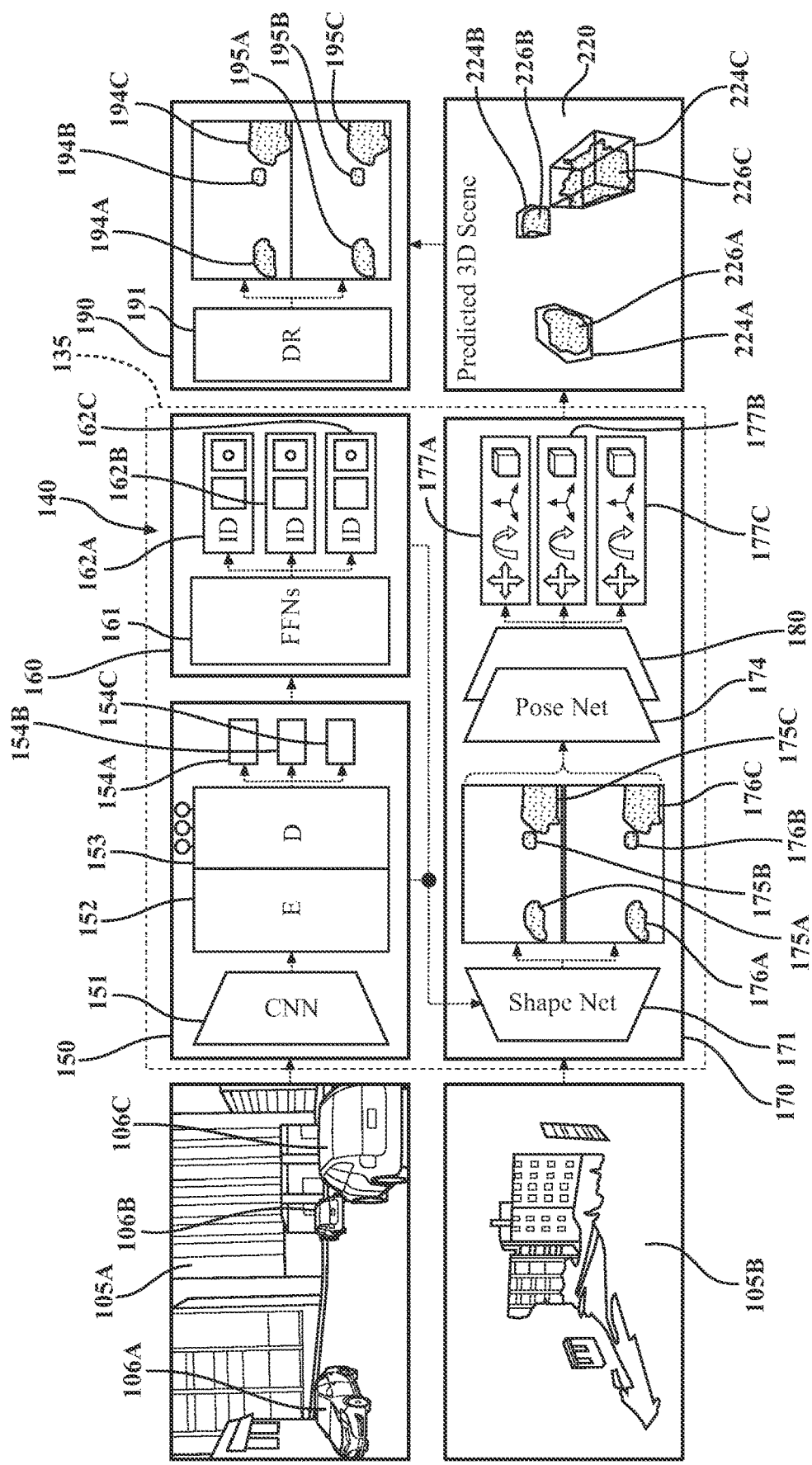
FIG. 3 illustrates a monocular 3-D object detection model that includes an adapter network that can adapt a model pre-trained on synthetic images to real-world data that was not observed at training time.

The training module 121 includes instructions that, when executed by the processor(s) 110, causes the processor(s) 110 to train the adapter network 180. In order to better understand this training process, reference is made to FIG. 3. Here, illustrated are more detailed views of the object reasoning network 150, the 2-D reasoning network 160, the 3-D reasoning network 170 that includes the adapter network 180, and the differentiable renderer 190. Broadly, the object reasoning network 150, the 2-D reasoning network 160, and the 3-D reasoning network 170 work together so that an input image 105A that includes objects 106A-106C, which may be vehicles, will be processed to generate a predicted scene 220 having 3-D bounding boxes 224A-224C containing 6D pose information of the objects 106A-106C, respectively. Additionally, partial shapes 226A-226C for each of the objects 106A-106C may also be recovered.

Here, the training module 121 causes the processor(s) 110 to provide the input image 105A to the object reasoning network 150. The object reasoning network 150 may be a set-based global loss that forces unique predictions via bipartite matching and a transformer encoder-decoder architecture. The object reasoning network 150 may include a convolution neural network ("CNN") 151 that retrieves image features from the input image 105A. The CNN 151 may be a ResNet50 network. To retrieve image features from the input image 105A, the CNN 151 flattens the input image 105A and supplements the input image 105A with a positional encoding.

Once these image features are obtained, the image features are fed into an encoder-decoder network that may include an encoder 152 and a decoder 153. The encoder 152 and the decoder 153, using the image features and the notion of object queries, can retrieve output features 154A-154C for each of the detected objects 106A-106C. The output features 154A-154C for each of the objects 106A-106C will be utilized by the 2-D reasoning network 160 and the 3-D reasoning network 170.

The 2-D reasoning network 160 may include one or more feedforward networks 161 that can generate the object reasoning estimates 162A-162C for each of the objects 106A-106C, respectively. The object reasoning estimates 162A-162C for each of the objects 106A-106C may include information such as object classes, 2-D bounding boxes, and projected center coordinates of the detected objects 106A-106C.

The 3-D reasoning network 170 may include a shape network 171 and a pose network 174. The shape network 171 can recover partial 3-D object shapes, while the pose network 174 can estimate object poses, including information regarding rotation, translation, scale, as well as uncertainties associated with each of the outputs. Here, the training module 121 causes the shape network 171 to receive as inputs the output features 154A-154C from the object reasoning network 150, and the object reasoning estimates 162A-162C from the 2-D reasoning network 160. Additionally, the shape network 171 may also receive, as an input, point cloud information 105B that is a point cloud of a scene that corresponds with the input image 105A. It should be understood that the use of point cloud information 105B may be entirely optional.

The shape network 171 may use the object reasoning estimates 162A-162C of the 2-D reasoning network 160 for each of the objects 106A-106C to compute multi-head attention scores of this embedding over the output of the encoder, generating M attention heatmaps per object in a small resolution. The M attention heatmaps per object are fed these maps to two feature pyramid network-like up-convolutional networks to output normalized partial shape maps 175A-175C and surface normal maps 176A-176C. The normalized shape maps 175A-175C are renderings of the normalized object coordinates of the objects 106A-106C, also known as NOCS, where RGB is used to encode the 3-D coordinates. For example, R, G, and B may represent x, y, and z, respectively.

The shape network 171 takes renderings and visualizes each 3-D color component in 3-D space and recovers a 3-D partial shape of the object visible from a particular view. The surface normal maps 176A-176C may be similar to the shape maps 175A-175C, but instead of having each 3-D color represent a coordinate, it represents a surface normal at the particular point in the object's canonical coordinate system.

The pose network 174 estimates the 3-D rotation, Z component, object scale, and 3-D bounding box extents. The pose network 174 may be modeled after PoseNet and may include a CNN trained end-to-end to regress a camera's orientation and position. As input, the pose network 174 uses the shape maps 175A-175C and/or the surface normal maps 176A-176C. Using this information, the pose network 174 can output the 3-D pose estimation information 177A-177C for each of the objects 106A-106C. The 3-D pose estimation information 177A-177C can include estimates for 3-D rotation, Z component, object scale, and/or 3-D bounding box extents. Eventually, this results in that the 3-D reasoning network 170 outputs a predicted scene 220 that can include 3-D bounding boxes 224A-224C for each of the objects 106A-106C having 6D pose information, as well as recovered partial shapes of the objects 106A-106C.

To filter erroneous pose estimates, the pose network 174 additionally learns associated uncertainty estimates for the 3-D pose estimation information 177A-177C for each of the objects 106A-106C. Moreover, since the pose network 174 is conditioned on the estimated shape maps 175A-175C and the surface normal maps 176A-176C, uncertainty estimates describe the quality and how good are they for rotation and translation estimation. To model rotational uncertainty for the quaternion-based estimates, the pose network 174 may regress parameters of a Bingham distribution for obtaining pose predictions and uncertainty information. Translational and scale uncertainties are modeled similarly by using simple Gaussian distributions.

As explained previously, the 3-D pose estimation information 177A-177C is generated by the coordinated effort of the object reasoning network 150, the 2-D reasoning network 160, and the 3-D reasoning network 170 and may be trained with synthetic images. As noted previously, the use of synthetic images to train these networks may result in these networks performing poorly when considering real-world data. For example, when the image resolution of the input image 105A is changed, the scale of the objects 106A-106C within the input image 105A is changed along with the translation of the objects 106A-106C with respect to a camera. This type of deformation can be recovered if the scale of the object is known. However, this becomes more difficult if the focal length of the camera generating the input image is changed since this also impacts the rotational component. This problem becomes more complicated when the scale of the object is unknown and different classes of objects need to be considered, such as automobiles, motorcycles, pedestrians, etc.

As explained previously, the shape network 171 recovers normalized partial shape maps 175A-175C. As such, camera parameter changes or other deformations do not affect the performance of the shape network 171. It has been observed that this is also true for the 2-D reasoning network 160. However, the pose network 174 is impacted by changes in camera parameters or other deformations.

To close this "domain gap" the 3-D reasoning network 170 also includes the adapter network 180, which can adapt models pre-trained on synthetic images to real-world data that was not observed at training time, allowing the model to be re-utilized for multiple real-world data sets. In this example, the adapter network 180 is part of the 3-D reasoning network 170 but could also be separate from the 3-D reasoning network 170. The adapter network 180 may be a CNN.

To train the adapter network 180, the training module 121 may cause the processor(s) 110 to filter out any estimation information 177A-177C with high pose, scale, and translation uncertainty. If the pose estimates are too far off and cannot be recovered based on a threshold or some other metric, the training module 121 may cause the processor(s) 110 to use a perspective-n-point solver with the shape maps 175A-175C and recovered partial shapes 226A-226C, defining 2-D-3-D correspondences, and treat these pose estimations as ground truth. If object scales present in the target dataset differ significantly, prior scales ambiguity can be resolved using unlabeled target depth maps and comparing them to rendered depth.

The training module 121 may cause the processor(s) 110 to generate, using the differentiable renderer 190 and the predicted scene 220, a rendered map. Differentiable rendering is a field that allows the gradients of 3-D objects to be calculated and propagated through images. The differentiable renderer 190 may be a surface element ("surfel") based differentiable renderer 191 that enables self-supervised domain adaptation of the pose network 174 by minimizing a photometric loss. The rendered map may include rendered shape maps 194A-194C and/or rendered surface normal maps 195A-195C.

To determine a loss to train the adapter network 180, a comparison is made between the rendered shape maps 194A-194C and the shape maps 175A-175C acting as a ground truth. Additionally or alternatively, the loss may be determined by comparing rendered surface normal maps 195A-195C and surface normal maps 176A-176C, with the surface normal maps 176A-176C acting as a ground truth. Based on this determined loss, one or more model weights 181 of the adapter network 180 will be adjusted. This process may continue iteratively until the performance of the adapter network 180 as such that it meets one or more goals. Once the adapter network 180 is trained, the adapter network can adapt a predicted scene outputted by the pose network 174 to adjust to accommodate any deformation of an input image.

Figure 4:
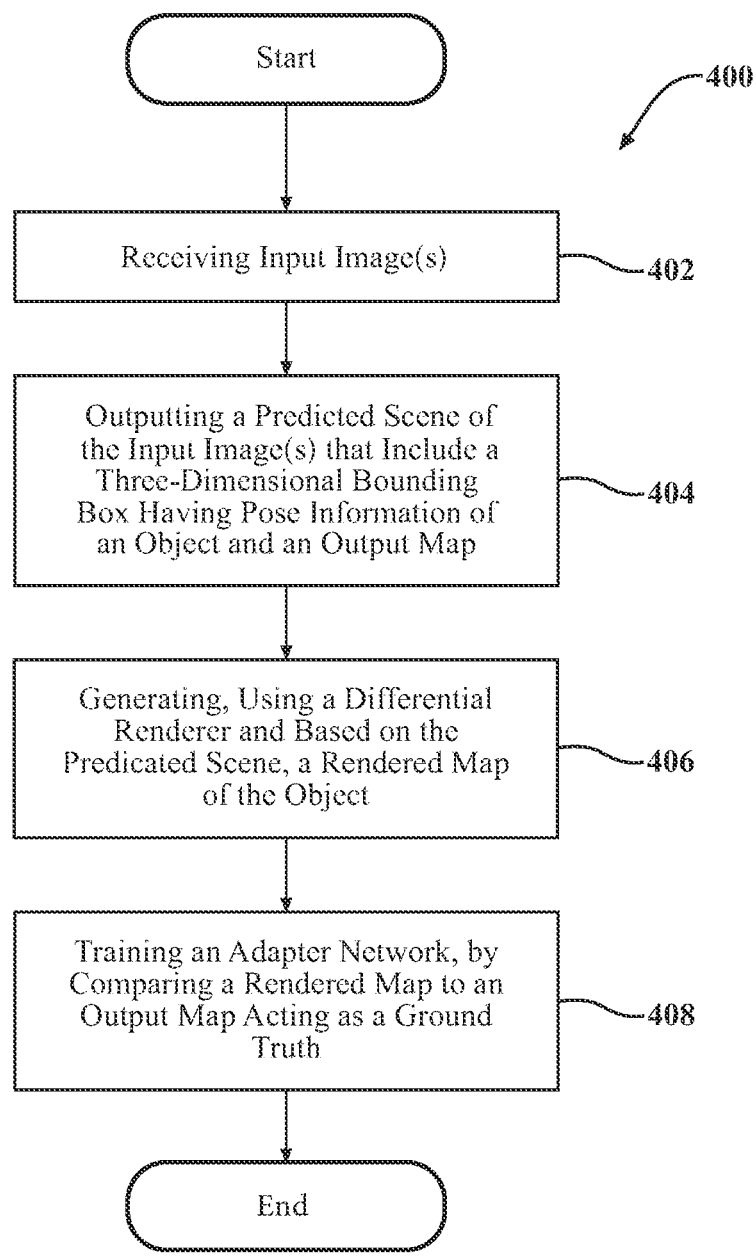
FIG. 4 illustrates a method for training an adapter network that can adapt a model pre-trained on synthetic images to real-world data that was not observed at training time.

Referring to FIG. 4, a method 400 for training an adapter network to improve transferability to real-world datasets is shown. The method 400 will be described from the viewpoint of the adapter network training system 100 of FIG. 2 and the monocular 3-D object detection model 135 of FIG. 3. However, it should be understood that this is just one example of implementing the method 400. While method 400 is discussed in combination with the adapter network training system 100, it should be appreciated that the method 400 is not limited to being implemented within the adapter network training system 100 but is instead one example of a system that may implement the method 400.

In step 402, the training module 121 causes the processor(s) 110 to receive input images. The input images may be synthetic or simulation-based input images stored in the synthetic training data 105. In one example, each of the input images may include several objects, such as objects 106A-106C, which may be vehicles. The monocular 3-D object detection model 135 can detect different types of objects and may be able to detect up to one hundred objects. However, the monocular 3-D object detection model 135 may detect more or fewer than one hundred objects.

In step 404, the training module 121 causes the processor(s) 110 to output the predicted scene 220 using the monocular 3-D object detection model 135. In one example, the predicted scene may include 3-D bounding boxes 224A-224C for each of the objects 106A-106C having 6D pose information, as well as recovered partial shapes of the objects 106A-106C. As explained previously, as an intermediate step in outputting the predicted scene 220, the shape network 171 may use the object reasoning estimates 162A-162C of the 2-D reasoning network 160 for each of the objects 106A-106C to generate output maps. These output maps may include normalized partial shape maps 175A-175C and surface normal maps 176A-176C. The normalized shape maps 175A-175C are renderings of the normalized object coordinates of the objects 106A-106C, also known as NOCS, where RGB is used to encode the 3-D coordinates. For example, R, G, and B may represent x, y, and z, respectively. The surface normal maps 176A-176C may be similar to the shape maps 175A-175C, but instead of having each 3-D color represent a coordinate, it represents a surface normal at the particular point in the object's canonical coordinate system.

In step 406, the training module 121 causes the processor(s) 110 to generate, using the differentiable renderer 190 and, based on the predicted scene 220, rendered maps of the objects 106A-106C. The rendered map may include rendered shape maps 194A-194C and/or rendered surface normal maps 195A-195C of the objects 106A-106C, respectively.

In step 408, the training module 121 causes the processor(s) 110 to train the adapter network 180 by comparing the rendered map (rendered shape maps 194A-194C and/or the rendered surface normal maps 195A-195C) to the output map (shape maps 175A-175C and/or surface normal maps 176A-176C), with the output map acting as a ground truth. Based on this determined loss, one or more model weights 181 of the adapter network 180 will be adjusted. This process may then end, as shown, or may continue iteratively until the performance of the adapter network 180 as such that it meets one or more goals.

Once the adapter network 180 is trained, the adapter network 180 can adapt a predicted scene outputted by the pose network 174 to adjust to accommodate any deformation of an input image. As such, by including the adapter network 180 as part of the monocular 3-D object detection model 135, the monocular 3-D object detection model, while pre-trained on synthetic images, can now be re-utilized for multiple real-world data sets.

The monocular 3-D object detection model 135 can be utilized in a number of different applications. For example, the monocular 3-D object detection model 135 can detect objects in a scene and determine 6D pose information for the detected objects. In one particularly useful by implication, the monocular 3-D object detection model 135 may be utilized within a vehicle that may be an autonomous vehicle. Moreover, autonomous vehicles can pilot themselves in certain situations by receiving sensor information that can be used by the monocular 3-D object detection model 135 to detect objects outside the vehicle.

Figure 5:
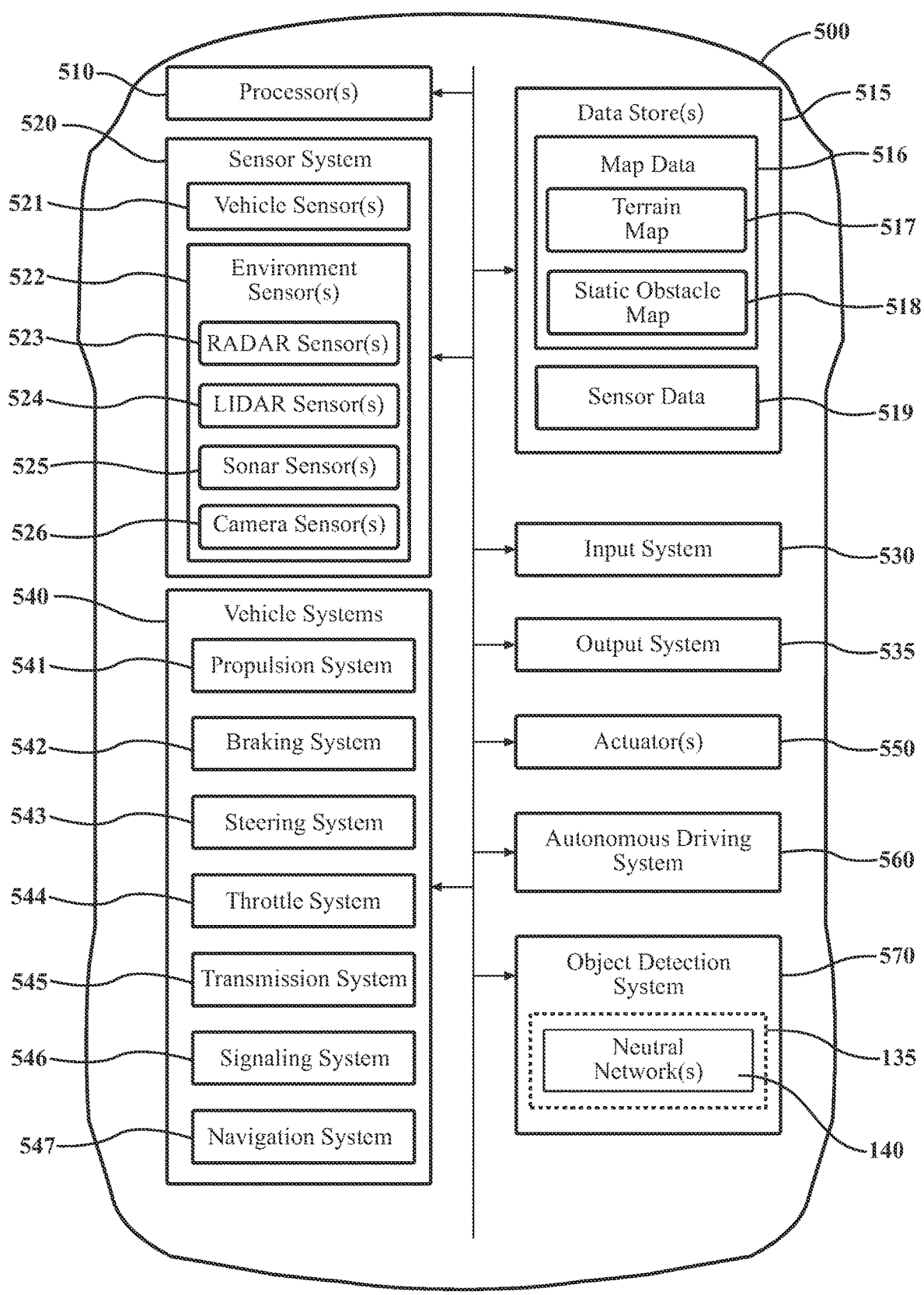
FIG. 5 illustrates a vehicle having an object detection system that utilizes a model that includes the adapter network of FIG. 3.

For example, referring to FIG. 5 illustrated is one example of a vehicle 500 that incorporates the monocular 3-D object detection model 135. As explained previously, the monocular 3-D object detection model 135 utilizes one or more neural network(s) 140, including the object reasoning network 150, the 2-D reasoning network 160, the 3-D reasoning network 170, and the adapter network 180.)

As used herein, a "vehicle" is any form of powered transport. In one or more implementations, the vehicle 500 is an automobile. While arrangements will be described herein with respect to automobiles, it will be understood that embodiments are not limited to automobiles. In some implementations, the vehicle 500 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 560.

The vehicle 500 also includes various elements. In various embodiments, it will be understood that it may not be necessary for the vehicle 500 to have all of the elements shown in FIG. 5. The vehicle 500 can have any combination of the various elements shown in FIG. 5. Further, the vehicle 500 can have additional elements to those shown in FIG. 5. In some arrangements, the vehicle 500 may be implemented without one or more of the elements shown in FIG. 5. While the various elements are shown as being located within the vehicle 500 in FIG. 5, it will be understood that one or more of these elements can be located external to the vehicle 500. Further, the elements shown may be physically separated by large distances and provided as remote services (e.g., cloud-computing services).

In one or more embodiments, the vehicle 500 is an autonomous vehicle. As used herein, "autonomous vehicle" refers to a vehicle that operates in an autonomous mode. "Autonomous mode" refers to navigating and/or maneuvering the vehicle 500 along a travel route using one or more computing systems to control the vehicle 500 with minimal or no input from a human driver. In one or more embodiments, the vehicle 500 is highly automated or completely automated. In one embodiment, the vehicle 500 is configured with one or more semi-autonomous operational modes in which one or more computing systems perform a portion of the navigation and/or maneuvering of the vehicle 500 along a travel route, and a vehicle operator (i.e., driver) provides inputs to the vehicle to perform a portion of the navigation and/or maneuvering of the vehicle 500 along a travel route. Such semi-autonomous operations can include supervisory control as implemented by the autonomous driving system 560 to ensure the vehicle 500 remains within defined state constraints.

The vehicle 500 can include one or more processor(s) 510. In one or more arrangements, the processor(s) 510 can be a main processor of the vehicle 500. For instance, the processor(s) 510 can be an electronic control unit (ECU). The vehicle 500 can include one or more data store(s) 515 to store one or more data types. The data store(s) 515 can include volatile and/or non-volatile memory. Examples of data store(s) 515 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 515 can be a component of the processor(s) 510, or the data store(s) 515 can be operatively connected to the processor(s) 510 for use thereby. The term "operatively connected," as used throughout this description, can include direct or indirect connections, including connections without direct physical contact.

In one or more arrangements, the one or more data store(s) 515 can include map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain map(s) 517. The terrain map(s) 517 can include information about the ground, terrain, roads, surfaces, and/or other features of one or more geographic areas. The terrain map(s) 517 can include elevation data in the one or more geographic areas. The map data 516 can be high quality and/or highly detailed. The terrain map(s) 517 can define one or more ground surfaces, which can include paved roads, unpaved roads, land, and other things that define a ground surface.

In one or more arrangements, the map data 516 can include one or more static obstacle map(s) 518. The static obstacle map(s) 518 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 518 can have location data, size data, dimension data, material data, and/or other data associated with it. The static obstacle map(s) 518 can include measurements, dimensions, distances, and/or information for one or more static obstacles. The static obstacle map(s) 518 can be high quality and/or highly detailed. The static obstacle map(s) 518 can be updated to reflect changes within a mapped area.

The one or more data store(s) 515 can include sensor data 519. In this context, "sensor data" means any information about the sensors that the vehicle 500 is equipped with, including the capabilities and other information about such sensors. As will be explained below, the vehicle 500 can include the sensor system 520. The sensor data 519 can relate to one or more sensors of the sensor system 520. As an example, in one or more arrangements, the sensor data 519 can include information on one or more LIDAR sensor(s) 524 and/or camera sensor(s) 526 of the sensor system 520.

In some instances, at least a portion of the map data 516 and/or the sensor data 519 can be located in one or more data store(s) 515 located onboard the vehicle 500. Alternatively, or in addition, at least a portion of the map data 516 and/or the sensor data 519 can be located in one or more data store(s) 515 that are located remotely from the vehicle 500.

As noted above, the vehicle 500 can include the sensor system 520. The sensor system 520 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the processor(s) 510, the data store(s) 515, and/or another element of the vehicle 50. The sensor system 520 can acquire data of at least a portion of the external environment of the vehicle 500 (e.g., nearby vehicles).

The sensor system 520 can include any suitable type of sensor. Various examples of different types of sensors will be described herein. However, it will be understood that the embodiments are not limited to the particular sensors described. The sensor system 520 can include one or more vehicle sensor(s) 521. The vehicle sensor(s) 521 can detect, determine, and/or sense information about the vehicle 500 itself. In one or more arrangements, the vehicle sensor(s) 521 can be configured to detect, and/or sense position and orientation changes of the vehicle 500, such as, for example, based on inertial acceleration. In one or more arrangements, the vehicle sensor(s) 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The vehicle sensor(s) 521 can be configured to detect, and/or sense one or more characteristics of the vehicle 500. In one or more arrangements, the vehicle sensor(s) 521 can include a speedometer to determine a current speed of the vehicle 500.

The sensor system 520 can include one or more environment sensors 522 configured to acquire, and/or sense driving environment data. "Driving environment data" includes data or information about the external environment in which an autonomous vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify and/or sense other things in the external environment of the vehicle 500, such as, for example, lane markers, signs, traffic lights, traffic signs, lane lines, crosswalks, curbs proximate the vehicle 500, off-road objects, etc.

Various examples of sensors of the sensor system 520 will be described herein. The example sensors may be part of the one or more environment sensors 522 and/or the one or more vehicle sensor(s) 521. However, it will be understood that the embodiments are not limited to the particular sensors described.

As an example, in one or more arrangements, the sensor system 520 can include one or more radar sensor(s) 523, one or more LIDAR sensor(s) 524, one or more sonar sensor(s) 525, and/or one or more camera sensor(s) 526. In one or more arrangements, the one or more camera sensor(s) 526 can be high dynamic range (HDR) cameras or infrared (IR) cameras. For example, the camera sensor(s) 526 may capture image information and provide the image information to the object detection system 570. The object detection system 570 will utilize the monocular 3-D object detection model 135 to identify objects within the captured images and/or provides 6D pose information regarding the objects identified within the captured images.

The vehicle 500 can include an input system 530. An "input system" includes any device, component, system, element, or arrangement or groups thereof that enable information/data to be entered into a machine. The input system 530 can receive an input from a vehicle passenger (e.g., a driver or a passenger). The vehicle 500 can include an output system 535. An "output system" includes any device, component, or arrangement, or groups thereof that enable information/data to be presented to a vehicle passenger (e.g., a person, a vehicle passenger, etc.).

The vehicle 500 can include one or more vehicle systems 540. Various examples of the one or more vehicle systems 540 are shown in FIG. 5. However, the vehicle 500 can include more, fewer, or different vehicle systems. It should be appreciated that although particular vehicle systems are separately defined, each or any of the systems or portions thereof may be otherwise combined or segregated via hardware and/or software within the vehicle 500. The vehicle 500 can include a propulsion system 541, a braking system 542, a steering system 543, throttle system 544, a transmission system 545, a signaling system 546, and/or a navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, or a geolocation system.

The processor(s) 510 and/or the autonomous driving system 560 can be operatively connected to communicate with the vehicle systems 540 and/or individual components thereof. For example, the processor(s) 510 and/or the autonomous driving system 560 can be in communication to send and/or receive information from the vehicle systems 540 to control the movement, speed, maneuvering, heading, direction, etc. of the vehicle 500. The processor(s) 510 and/or the autonomous driving system 560 may control some or all of these vehicle systems 540 and, thus, may be partially or fully autonomous.

The vehicle 500 can include one or more actuators 550. The actuators 550 can be any element or combination of elements operable to modify, adjust and/or alter one or more of the vehicle systems 540 or components thereof to responsive to receiving signals or other inputs from the processor(s) 510 and/or the autonomous driving system 560. Any suitable actuator can be used. For instance, the one or more actuators 550 can include motors, pneumatic actuators, hydraulic pistons, relays, solenoids, and/or piezoelectric actuators, just to name a few possibilities.

The autonomous driving system 560 can be configured to receive data from the sensor system 520 and/or any other type of system capable of capturing information relating to the vehicle 500 and/or the external environment of the vehicle 500, such as the object detection system 570, which may utilize the monocular 3-D object detection model 135. In one or more arrangements, the autonomous driving system 560 can use such data to generate one or more driving scene models. The autonomous driving system 560 can determine position and velocity of the vehicle 500. The autonomous driving system 560 can determine the location of obstacles, obstacles, or other environmental features, including traffic signs, trees, shrubs, neighboring vehicles, pedestrians, etc.

The autonomous driving system 560 can be configured to receive and/or determine location information for obstacles within the external environment of the vehicle 500 for use by the processor(s) 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The autonomous driving system 560 can be configured to determine travel path(s), current autonomous driving maneuvers for the vehicle 500, future autonomous driving maneuvers and/or modifications to current autonomous driving maneuvers based on data acquired by the sensor system 520, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 500, changing travel lanes, merging into a travel lane, and/or reversing, just to name a few possibilities. The autonomous driving system 560 can be configured to implement determined driving maneuvers. The autonomous driving system 560 can cause, directly or indirectly, such autonomous driving maneuvers to be implemented. As used herein, "cause" or "causing" means to make, command, instruct, and/or enable an event or action to occur or at least be in a state where such event or action may occur, directly or indirectly. The autonomous driving system 560 can be configured to execute various vehicle functions and/or to transmit data to, receive data from, interact with, and/or control the vehicle 500 or one or more systems thereof (e.g., one or more of vehicle systems 540).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather provide an understandable description of possible implementations. Various embodiments are shown in the figures, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. As used herein, the term "another" is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor; and
   a memory in communication with the processor and having machine-readable instructions that, when executed by the processor, cause the processor to:
      output, using a neural network that utilizes an input image that includes an object, a predicted scene that includes a three-dimensional bounding box having pose information of the object, wherein the neural network generates, in an intermediate operation, an output map indicating at least one of a shape of the object and a surface normal of the object;
      generate, using a differentiable renderer and based on the predicted scene, a rendered map of the object, the rendered map including at least one of a rendered shape of the object and a rendered surface normal of the object, and
      train an adapter network, which adapts the predicted scene to adjust for a deformation of the input image, by comparing the rendered map to the output map, wherein the output map is a ground truth.

2. The system of claim 1, wherein the neural network includes an object-reasoning network, a two-dimensional reasoning network, and a three-dimensional reasoning network.

3. The system of claim 2, wherein the machine-readable instructions further comprise instructions that, when executed by the processor, cause the processor to:
   generate, by the object-reasoning network, object features for the object in the input image;
   generate, by the two-dimensional reasoning network, an object class, a two-dimensional bounding box, and a center coordinate for the object based on the object features from the object-reasoning network; and
   generate, by the three-dimensional reasoning network, the three-dimensional bounding box having the pose information of the object based on the object features from the object-reasoning network and the object class, the two-dimensional bounding box, and the center coordinate from the two-dimensional reasoning network.

4. The system of claim 3, wherein the machine-readable instructions further comprise instructions that, when executed by the processor, cause the processor to use point cloud information by the three-dimensional reasoning network to generate the three-dimensional bounding box having the pose information of the object.

5. The system of claim 1, wherein:
   the output map includes at least one of a shape map indicating the shape of the object and a surface normal map indicating the surface normal of the object; and
   the rendered map includes at least one of a rendered shape map indicating the rendered shape of the object and a rendered surface normal map indicating the rendered surface normal of the object.

6. The system of claim 5, wherein the machine-readable instructions further comprise instructions that, when executed by the processor, cause the processor to:
   generate, by a shape network, the shape map, and the surface normal map;
   generate, by a pose network, the predicted scene based on the shape map and the surface normal map; and
   adapt, by the adapter network, the predicted scene to adjust the deformation of the input image.

7. The system of claim 5, wherein the shape map is an RGB image used to encode three-dimensional coordinates.

8. The system of claim 5, wherein the machine-readable instructions further comprise instructions that, when executed by the processor, cause the processor to:
   determine an uncertainty of the pose information; and
   generate, when the uncertainty is above a threshold, the pose information using a perspective-n-point solver that utilizes the shape map.

9. The system of claim 1, wherein the neural network is initially trained using simulation-based training sets.

10. A method comprising steps of:
    outputting, by a neural network using an input image having an object, a predicted scene that includes a three-dimensional bounding box having pose information of the object, wherein the neural network generates, in an intermediate operation, an output map indicating at least one of a shape of the object and a surface normal of the object;
    generating, using a differentiable renderer and based on the predicted scene, a rendered map of the object, the rendered map including at least one of a rendered shape of the object and a rendered surface normal of the object; and
    training an adapter network, which adapts the predicted scene to adjust for a deformation of the input image, by comparing the rendered map to the output map, wherein the output map is a ground truth.

11. The method of claim 10, wherein the neural network includes an object-reasoning network, a two-dimensional reasoning network, and a three-dimensional reasoning network.

12. The method of claim 11, further comprising the steps of:
    generating, by the object-reasoning network, object features for the object in the input image;
    generating, by the two-dimensional reasoning network, an object class, a two-dimensional bounding box, and a center coordinate for the object based on the object features from the object-reasoning network; and generating, by the three-dimensional reasoning network, the three-dimensional bounding box having the pose information of the object based on the object features from the object-reasoning network and the object class, the two-dimensional bounding box, and the center coordinate from the two-dimensional reasoning network.

13. The method of claim 12, further comprising the step of using point cloud information by the three-dimensional reasoning network to generate the three-dimensional bounding box having the pose information of the object.

14. The method of claim 10, wherein:

the output map includes at least one of a shape map indicating the shape of the object and a surface normal map indicating the surface normal of the object; and the rendered map includes at least one of a rendered shape map indicating the rendered shape of the object and a rendered surface normal map indicating the rendered surface normal of the object.

15. The method of claim 14, further comprising the steps of generating, by a shape network, the shape map, and the surface normal map;

generating, by a pose network, the predicted scene based on the shape map and the surface normal map; and adapting, by the adapter network, the predicted scene to adjust the deformation of the input image.

16. The method of claim 14, wherein the shape map is an RGB image used to encode three-dimensional coordinates.

17. The method of claim 14, further comprising the steps of:

determining an uncertainty of the pose information; and generating, when the uncertainty is above a threshold, the pose information using a perspective-n-point solver that utilizes the shape map.

18. The method of claim 10, wherein the neural network is initially trained using simulation-based training sets.

19. A non-transitory computer-readable medium comprising instructions that, when executed by a processor, causes the processor to:

output, using a neural network that utilizes an input image that includes an object, a predicted scene that includes a three-dimensional bounding box having pose information of the object, wherein the neural network generates, in an intermediate operation, an output map indicating at least one of a shape of the object and a surface normal of the object;

generate, using a differentiable renderer and based on the predicted scene, a rendered map of the object, the rendered map including at least one of a rendered shape of the object and a rendered surface normal of the object; and train an adapter network, which adapts the predicted scene to adjust for a deformation of the input image, by comparing the rendered map to the output map, wherein the output map is a ground truth.

20. The non-transitory computer-readable medium of claim 19 further comprising instructions that, when executed by the processor, causes the processor to:

generate, by an object-reasoning network, object features for the object in the input image;

generate, by a two-dimensional reasoning network, an object class, a two-dimensional bounding box, and a center coordinate for the object based on the object features from the object-reasoning network; and generate, by a three-dimensional reasoning network, the three-dimensional bounding box having the pose information of the object based on the object features from the object-reasoning network and the object class, the two-dimensional bounding box, and the center coordinate from the two-dimensional reasoning network.

\* \* \* \* \*